United States Patent [19]

Haslam

[11] 4,058,589
[45] Nov. 15, 1977

[54] TREATMENT OF AMMONIA SYNTHESIS PURGE GAS

[75] Inventor: Alan Alfred Haslam, Stockport, England

[73] Assignee: Petrocarbon Developments Limited, Manchester, England

[21] Appl. No.: 653,830

[22] Filed: Jan. 30, 1976

[30] Foreign Application Priority Data

Feb. 6, 1975 United Kingdom .................. 5111/75

[51] Int. Cl.² ............................................... C01C 1/04
[52] U.S. Cl. ..................................... 423/359; 423/262
[58] Field of Search ............... 423/359, 360, 361, 362, 423/262

[56] References Cited

U.S. PATENT DOCUMENTS

| 2,545,778 | 3/1951 | Haringhuizen | 423/359 |
| 3,350,170 | 10/1967 | Finneran et al. | 423/359 |
| 3,721,098 | 3/1973 | Forg et al. | 423/359 |

FOREIGN PATENT DOCUMENTS

| 1,478,558 | 4/1967 | France | 423/262 |
| 1,057,020 | 2/1967 | United Kingdom | 423/359 |
| 1,274,504 | 5/1972 | United Kingdom | 423/359 |
| 901,580 | 7/1962 | United Kingdom | 423/262 |

Primary Examiner—O. R. Vertiz
Assistant Examiner—Eugene T. Wheelock
Attorney, Agent, or Firm—Browdy and Neimark

[57] ABSTRACT

In the synthesis of ammonia with recycle of unreacted nitrogen and hydrogen to the reactor, a purge gas stream is removed from the recycle stream and partially condensed using refrigeration provided by the expansion and subsequent vaporization of the condensate. After partial condensation the condensate is rich in methane and argon while the gaseous phase is hydrogen enriched. The gaseous stream from the partial condensation is returned to the reactor and a bleed stream is removed from this gaseous stream at a temperature not exceeding 30° C above the subambient temperature of the condensation. At least a part of the bleed stream is then expanded and injected into the expanded condensate prior to vaporization in the refrigeration step. Accumulation of helium, argon and methane impurities in the reactor can thus be prevented and expanded vaporized combined condensate and bleed can be recovered at a suitable pressure for use as a fuel gas stream.

3 Claims, 1 Drawing Figure

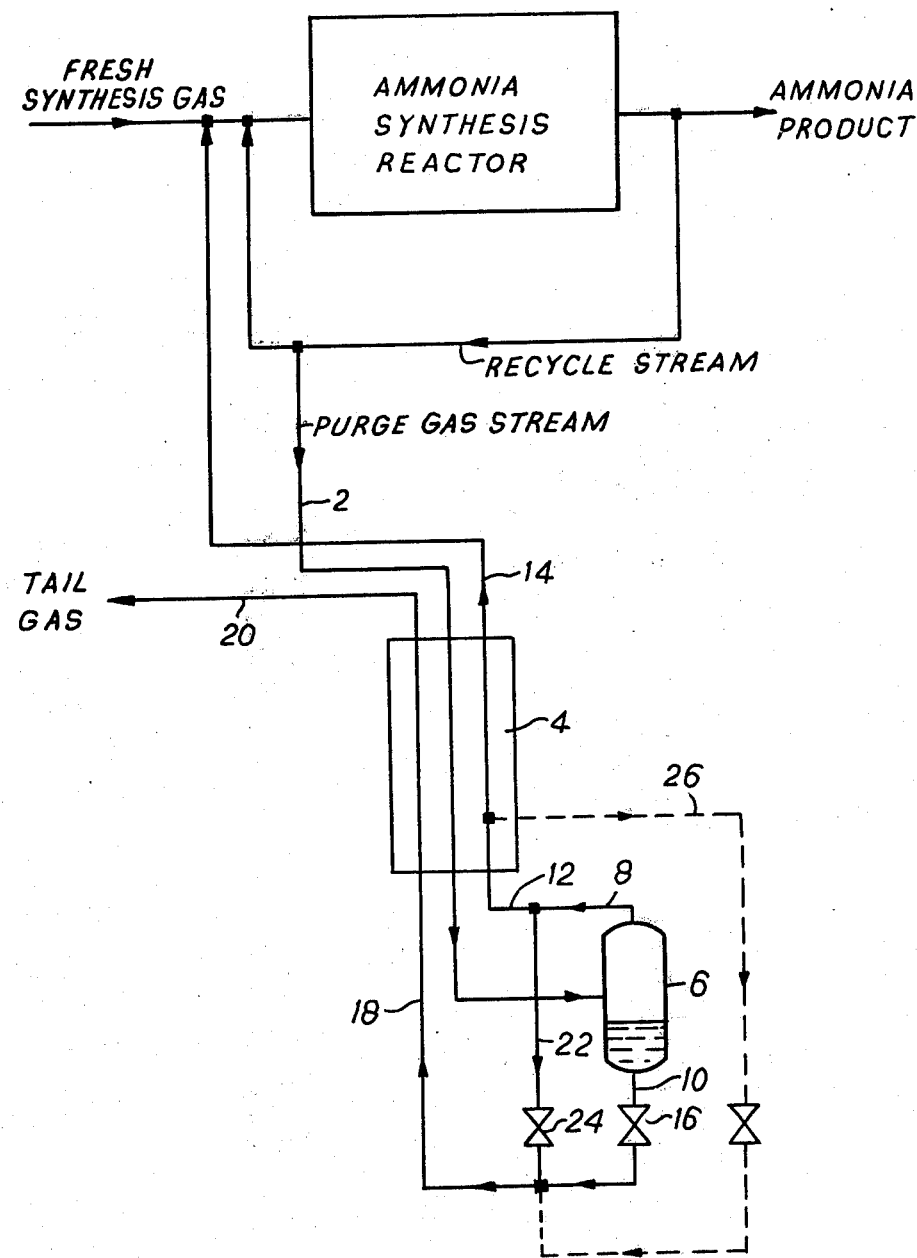

TREATMENT OF AMMONIA SYNTHESIS PURGE GAS

This invention relates to an improvement in the treatment of ammonia synthesis purge gas.

In a widely practiced process, ammonia is synthesized at superatmospheric pressure from a synthesis gas comprising hydrogen and nitrogen ideally in a ratio of 3 parts hydrogen to 1 part nitrogen by volume. However, in commercial processes, the ammonia synthesis gas also generally contains methane (about 1 mole %) introduced with the hydrogen, and argon (about 0.3 mole %) introduced with the nitrogen.

The methane and argon take no part in the ammonia synthesis and are therefore removed along with the unreacted hydrogen and nitrogen from the ammonia product which condenses out. To improve the efficiency of the process, the gas stream containing the unreacted nitrogen and hydrogen, and also containing the methane and argon impurities, is recycled to the ammonia synthesis reaction zone where it mixes with fresh nitrogen and hydrogen containing fresh amounts of these impurities, and thus these impurities tend to accumulate in the reaction zone as time proceeds, thereby lowering the partial pressure of the reacting mixture and hence reducing ammonia yield. Action therefore has to be taken to prevent the concentration of these impurities in the reactor from exceeding an acceptable level.

To this end, it is general practice to continuously withdraw a purge gas stream which is at superatmospheric pressure from the recycling gas stream. However, this purge gas stream, which will have the same constitution as the recycling gas stream, also contains hydrogen and nitrogen of which the hydrogen is the more valuable. It is therefore desirable to recover as much as possible of this hydrogen for return to the ammonia synthesis reaction zone.

In practice, this is achieved in a hydrogen recovery plant wherein the purge gas stream is subjected to partial condensation at sub-ambient temperatures to separate a hydrogen-enriched gaseous stream, which will also contain some nitrogen, from a condensed material which will comprise most of the argon and methane and the remainder of the nitrogen and hydrogen. The gaseous hydrogen-rich stream may then be recycled to the ammonia synthesis reaction zone or otherwise used and it will be understood that since it is generally not economical to operate the process in such manner that all the argon and methane is separated out, the rate at which the purge gas stream is withdrawn from the recycling gas stream will depend inter alia on the efficiency of the separation in the hydrogen recovery plant.

Recently, it has become increasingly common to provide the hydrogen for the ammonia synthesis by the steam-reforming of methane obtained from natural gas. Many natural gases, however, contain helium and in such cases the helium is concentrated in the hydrogen from the stream-reforming process. Accordingly, it is now common to find a further inert component, helium, in ammonia synthesis gas. Furthermore, where it is the practice to return the hydrogen-rich stream recovered from the purge gas to the ammonia synthesis reactor, there is a tendency for this helium to accumulate in the reactor since at most only trace amounts of it are separated with the argon and methane by the partial condensation process and it therefore largely remains with the hydrogen in the hydrogen-rich stream.

In our British Patent Specification number 1274504, we describe and claim a method for preventing the accumulation of this helium in the ammonia synthesis reaction zone when the hydrogen is derived from helium-containing natural gas. The method comprises removing a bleed stream from the purge gas stream, before or after the partial condensation of the purge gas stream to remove methane and argon therefrom, and controlling the rate of withdrawal of the condensate stream obtained from the partial condensation of the purge gas stream and the rate of withdrawal of the bleed stream so that methane, argon and helium are removed from the system at the same rate at which they are introduced with fresh synthesis gas feed to the ammonia synthesis reaction zone.

The condensate stream generally contains not only methane but also some hydrogen since it is not practicable to effect complete separation. The evaporated condensate, therefore, is potentially useful as a fuel gas. However, it is usual to provide refrigeration for the partial condensation step by expanding this condensate and evaporating the expanded material in indirect heat exchange with the purge gas stream. The pressure to which the condensate has to be expanded to achieve the necessary heat balance in the heat exchange step is generally too low for most subsequent potential uses of the expanded condensate and it is generally necessary, therefore, to recompress the expanded condensate prior to supplying it to the consumer.

We have now developed a process which reduces or avoids the need for such recompression and also utilizes the rich fuel values of the bleed stream.

According to the present invention, we provide a method of synthesizing ammonia by reacting a synthesis gas comprising nitrogen and hydrogen at superatmospheric pressure in a reaction zone with recycling of unreacting gas to the reaction zone and in which the hydrogen is derived from helium-containing natural gas, said method comprising i. withdrawing a purge gas stream at superatmospheric pressure from the gas being recycled, ii. cooling the purge gas stream to sub-ambient temperature to partially condense it and form a condensate phase containing methane and argon and a hydrogen-enriched gaseous phase containing helium, iii. phase separating the product of the partial condensation into a gaseous hydrogen-enriched stream containing helium and at least one condensate stream containing methane and argon, iv. recycling the gaseous hydrogen-enriched stream to the reaction zone, v. providing refrigeration for said cooling and partial condensation of the purge gas stream by expanding at least a part of said at least one condensate stream and evaporating the expanded condensate in indirect heat exchange with the purge gas stream, vi. lowering the bubble point of the expanded condensate by withdrawing a bleed stream from said hydrogen enriched gaseous stream, expanding at least a part of said bleed stream and injecting the expanded material into said expanded condensate prior to evaporating the latter, and vii. maintaining the concentrations of methane, argon and helium in the ammonia synthesis reaction zone substantially constant by withdrawing helium, argon and methane in said bleed stream and said at least one condensate stream at substantially the same rate as they are introduced into the ammonia synthesis reaction zone with fresh synthesis gas.

As the condensate usually contains small amounts of helium, it will be appreciated that whereas by far the larger proportion of the helium is withdrawn from the system in the bleed stream, some is also withdrawn from the system in the condensate. The required rate of withdrawal of the bleed stream is therefore dependent inter alia on the rate at which helium is removed from the system in the condensate.

By injecting expanded bleed stream into expanded condensate in accordance with the invention, the temperature range in which the expanded condensate will evaporate is lowered or alternatively the expanded condensate will evaporate in the same temperature range but at a higher pressure. It is thus possible to obtain a substantial increase in the pressure at which the evaporated condensate is obtainable from the heat exchange step, thereby obviating the need to install equipment for its re-compression prior to supplying it as a fuel gas to a consumer. Moreover, as expanded bleed stream is incorporated into expanded concentrate, fuel values of the bleed stream can be utilized.

In general, it is preferred to expand all the condensate for subsequent evaporation in indirect heat exchange with the purge gas stream since this maximizes the utilization of the refrigeration potential of the condensate. It is also generally preferred to expand all the bleed stream and inject the whole thereof into the expanded condensate since this will achieve the greatest reduction in bubble point of the expanded condensate and also ensure that none of the fuel value of the bleed stream is lost.

It is usual for the cold in the gaseous hydrogen-enriched stream to be used to assist the cooling of the purge gas to effect partial condensation of said purge gas, by effecting indirect heat exchange between said gaseous hydrogen enriched stream and said purge gas stream.

In its simplest form the partial condensation of the purge gas may be effected in a single heat exchange step which may employ one or more heat exchangers in series and in which the purge gas is cooled and partly condensed to produce the gaseous hydrogen-rich stream and a liquid stream of condensed material, which streams are subsequently separated in a suitable gas/liquid separator.

In general, however, two or more heat exchange steps in series are used and it is common practice for the material condensed from the purge gas stream as a result of each heat exchange step to be separated out before the purge gas stream is subjected to the next heat exchange step in the series, so that in effect a plurality of partial condensations are effected.

The present invention is applicable where one or where a plurality of heat exchange steps is used and, in the latter case, is applicable both to the case where the separation is effected in one step after all the heat exchange steps are complete and to the case where separation takes place after each of two or more of the heat exchange steps.

Where a plurality of separation steps is employed, the bleed stream will be withdrawn from the gaseous hydrogen-enriched stream resulting from the final separation step and this bleed stream may if desired be divided into a plurality of streams which are injected after expansion into two or more of the condensates resulting from the series of separation steps, after expansion of said condensates.

The bleed stream is preferably injected into the expanded condensate at as low a temperature as possible so that the latter is at as low a temperature as possible when heat-exchanged with the purge gas. To this end, the bleed stream is preferably removed from the hydrogen-enriched stream at substantially the temperature at which said hydrogen-enriched stream is separated from the condensate. However, in some cases, the result of injecting the thus obtained bleed stream into the condensate may lead to solid methane being deposited from the liquid and in such cases it is preferred to withdraw the bleed stream from the hydrogen-enriched stream after the latter has been warmed sufficiently, e.g. by heat exchange with the purge gas stream, to avoid this undesirable deposition. However care must be taken that the bleed stream is not warmed so much that it is not possible to obtain the necessary heat balance in the heat exchange step between the purge stream and the evaporating stream comprising the expanded condensate and injected expanded bleed stream. In general an increase in temperature of 20° C is sufficient but the actual temperature rise that is required depends upon the constitution of each of the streams and can be determined empirically or by calculation using well known techniques.

The invention is now illustrated by the following Example and with the aid of the accompanying drawing which is a simplified flow diagram of one embodiment of the process using a single heat exchange step with subsequent gas/liquid separation.

Referring to the drawing, a purge gas stream withdrawn from a recycle gas stream from an ammonia synthesis plant and containing hydrogen, nitrogen, argon, methane and helium is fed at 735 psig pressure and ambient temperature through pipeline 2 to the heat exchanger 4 where it is cooled to about 85° K and partially condensed by indirect counter-current heat exchange with the streams in pipelines 12 and 18 and the constitution of each of which is particularized below. The cooled, partially condensed stream is passed to vapor/liquid separator 6 where it is separated into a hydrogen-rich gaseous stream which is withdrawn through pipeline 8 and a stream of condensate which is withdrawn through pipeline 10.

The major part of the gaseous stream, which consists primarily of hydrogen and with a few percent each of nitrogen and helium and residual amounts of methane and argon, is passed via pipeline 12 back through the heat exchanger to provide the first cooling stream and is recovered from the heat exchanger in pipeline 14 at about ambient temperature and at substantially the same pressure as that of the incoming purge gas.

The condensate recovered from the separator, which contains most of the argon and methane in the purge gas, is expanded to 80 psig in expansion valve 16 and is passed via pipeline 18 back through heat exchanger where it evaporates and thereby cools the incoming purge gas. The evaporated condensate is removed as tail gas in pipeline 20 at about ambient temperature.

In accordance with the invention, a bleed stream is withdrawn from the hydrogen-rich stream through pipeline 22, expanded to the same pressure as the expanded liquid condensate in expansion valve 24 and injected into the expanded liquid condensate in pipeline 18. The combined stream thus formed is at a temperature of about 82° K in pipeline 18 before it enters the heat exchanger.

The rate of flow of the bleed stream in pipeline 22 is controlled to be such that the rate of removal of helium in the bleed stream and in the condensate (which also contains trace amounts of helium) is substantially equal to the rate of introduction of the helium with the fresh synthesis gas to the ammonia synthesis reactor so that the overall concentration of helium in the synthesis gas in the reactor remains substantially constant.

The following compositions and flow rates for the various streams are given by way of example and apply to a purge gas stream from a reactor operating on a fresh synthesis gas stream the hydrogen content of which is derived from a stream of natural gas containing approximately 0.05 mole % He and flowing at 3.25 × 10⁶ SCFH. The said fresh synthesis gas stream also contained Ar and $CH_4$, at flow rates of approximately 16360 and 31620 SCFH respectively.

|  | Purge Gas Stream in line 2 | Hydrogen Rich Product Stream in line 14 | Bleed Stream in line 22 | Condensate in line 10 | Tail Gas in line 18 |
|---|---|---|---|---|---|
| $H_2$(mole%) | 65.17 | 87.45 | 87.45 | 7.02 | 25.16 |
| $N_2$(mole%) | 20.85 | 7.43 | 7.43 | 55.87 | 44.95 |
| Ar(mole%) | 3.97 | 0.69 | 0.69 | 12.53 | 9.86 |
| $CH_4$(mole%) | 6.95 | 0.21 | 0.21 | 24.54 | 19.05 |
| He(mole%) | 3.06 | 4.22 | 4.22 | 0.04 | 0.98 |
|  | 100.00 | 100.00 | 100.00 | 100.00 | 100.00 |
| Flow rate (SCFH) | 464,000 | 298,027 | 37,440 | 128,533 | 165,973 |
| Pressure Nominal (PSIG) | 735 | 735 | 735 | 735 | 80 |

It can be seen from the above table that argon, methane and helium are being withdrawn in the tail gas at substantially the same rate at which they are being supplied to the ammonia synthesis reactor in the fresh synthesis gas, thereby providing for substantially constant conditions of concentration of these materials in the ammonia synthesis reactor.

By way of comparison, if the helium concentration in the ammonia synthesis reactor is controlled by removing a bleed stream from the purge gas stream prior to subjecting the purge gas stream to the partial condensation, e.g. in accordance with the process of FIG. 2 of British patent specification 1,274,504, and passing this bleed stream to waste, it will be necessary to expand the condensate from the partial condensation to a much lower pressure (18 psig) to achieve the required refrigeration of the purge gas stream to achieve the same degree of separation in the partial condensation step. In this case typical data for the various streams, using the same ammonia synthesis conditions, are as follows:

|  | Purge Gas Stream | Bleed Stream taken to waste | Hydrogen Rich Product Stream returned to ammonia reactor | Condensate | Tail Gas |
|---|---|---|---|---|---|
| $H_2$(mole%) | 65.17 | 65.17 | 87.45 | 7.02 | 7.02 |
| $N_2$(mole%) | 20.85 | 20.85 | 7.43 | 55.87 | 55.87 |
| Ar(mole%) | 3.97 | 3.97 | 0.69 | 12.53 | 12.53 |
| $CH_4$(mole%) | 6.95 | 6.95 | 0.21 | 24.54 | 24.54 |
| He(mole%) | 3.06 | 3.06 | 4.22 | 0.04 | 0.04 |
|  | 100.00 | 100.00 | 100.00 | 100.00 | 100.00 |
| Flow rate (SCFH) | 464,000 | 51,634 | 298,132 | 114,234 | 114,234 |
| Pressure (nominal) (PSIG) | 735 | 735 | 735 | 735 | 18 |

It will be seen from the above that the process of the invention not only provides a tail gas stream at elevated pressure but also improves the overall fuel value and rate of supply of the tail gas without substantially affecting the rate of recycle of the hydrogen and nitrogen to the ammonia synthesis reactor.

Referring again to the drawing, if the temperature in the vapor/liquid separator is such that solid methane forms when the bleed stream is injected through pipeline 22 into the condensate in pipeline 18, the bleed stream can alternatively be withdrawn through pipeline 26 after the hydrogen-rich product has been warmed to some extent by heat-exchange with the incoming purge gas. Generally, the extent to which the bleed stream should be warmed will be in the range 10° C to 30° C.

I claim:

1. A method of synthesizing ammonia, comprising the steps of:
   i. reacting a synthesis gas comprising nitrogen and hydrogen, and also including methane, argon and helium as contaminants, at superatmospheric pressure in an ammonia synthesis reaction zone and recycling unreacted gas to the reaction zone;
   ii. withdrawing a purge gas stream at superatmospheric pressure from the gas being recycled;
   iii. removing methane and argon from the purge gas stream by cooling the purge gas stream to a subambient temperature to partially condense it and form a condensate phase containing methane and argon and a hydrogen-enriched gaseous phase containing helium and separating the phases into a gaseous hydrogen-enriched stream containing helium and at least one condensate stream containing methane and argon, and recycling said gaseous hydrogen-enriched stream to said reaction zone;
   iv. providing refrigeration for said cooling and partial condensation of the purge gas stream by expanding at least a part of said at least one condensate stream and evaporating the expanded condensate in indirect heat exchange with the purge gas stream, and then withdrawing the evaporated expanded condensate as tail gas;
   v. withdrawing a single bleed stream from the recycling hydrogen enriched stream;
   vi. maintaining the concentration of methane, argon and helium in the ammonia synthesis reaction zone substantially constant by withdrawing helium, argon and methane in said bleed stream and said at least one condensate stream at substantially the same rate as they are introduced into the ammonia synthesis reaction zone with fresh synthesis gas; and
   vii. recovering the tail gas at a pressure above 18 psig by withdrawing said bleed stream from said hydrogen enriched stream at a temperature not exceeding 30° C above said subambient temperature, expanding at least a part of said bleed stream and injecting said expanded part into said expanded condensate prior to evaporating the latter.

2. A method as claimed in claim 1 in which the cooling and partial condensation of the purge gas stream are effected by a plurality of heat exchange steps with separation of the condensate formed in each heat exchange step before the gas stream is subjected to the next heat exchange step, and the bleed stream is withdrawn from the gaseous hydrogen-enriched stream resulting from the final separation step.

3. A method as claimed in claim 1 in which the bleed stream is removed from the hydrogen-enriched stream at substantially the temperature at which said hydrogen-enriched stream is separated from the condensate.

* * * * *